(12) United States Patent
Mizokoshi

(10) Patent No.: US 7,546,192 B2
(45) Date of Patent: Jun. 9, 2009

(54) MULTIPLEX COMMUNICATION SYSTEM AND CAR-PASSENGER PROTECTION SYSTEM USING THE SAME

(75) Inventor: Kazuyoshi Mizokoshi, Honjo (JP)

(73) Assignee: Calsonic Kansei Corporation, Tokyo (JP)

( * ) Notice: Subject to any disclaimer, the term of this patent is extended or adjusted under 35 U.S.C. 154(b) by 1199 days.

(21) Appl. No.: 10/373,200

(22) Filed: Feb. 26, 2003

(65) Prior Publication Data
US 2004/0024832 A1 Feb. 5, 2004

(30) Foreign Application Priority Data
Feb. 27, 2002 (JP) ............... 2002-052026

(51) Int. Cl.
*B60R 22/00* (2006.01)
*B60R 21/16* (2006.01)
*B60L 3/00* (2006.01)
*B60K 28/14* (2006.01)

(52) U.S. Cl. ............... 701/45; 280/735; 180/271; 180/282

(58) Field of Classification Search ............... None
See application file for complete search history.

(56) References Cited

U.S. PATENT DOCUMENTS

| | | | |
|---|---|---|---|
| 5,079,759 A | 1/1992 | Kajiyama | |
| 5,090,012 A * | 2/1992 | Kajiyama et al. ............... 370/449 |
| 5,173,614 A * | 12/1992 | Woehrl et al. ............... 307/10.1 |
| 5,305,316 A | 4/1994 | Yoshida et al. | |
| 5,468,013 A * | 11/1995 | Gille ............... 280/729 |
| 5,760,489 A * | 6/1998 | Davis et al. ............... 307/10.1 |
| 5,900,807 A * | 5/1999 | Moriyama et al. ............... 340/436 |
| 5,964,816 A * | 10/1999 | Kincaid ............... 701/45 |
| 6,345,220 B1 * | 2/2002 | Ikegami ............... 701/45 |
| 6,392,558 B1 * | 5/2002 | Schulmeyer et al. ... 340/825.52 |
| 6,422,596 B1 * | 7/2002 | Fendt et al. ............... 280/735 |
| 6,428,040 B2 * | 8/2002 | Sakakida ............... 280/735 |
| 6,532,408 B1 * | 3/2003 | Breed ............... 701/45 |
| 6,536,798 B1 * | 3/2003 | Hamilton ............... 280/735 |
| 6,615,122 B1 * | 9/2003 | Yamashita ............... 701/45 |
| 6,733,036 B2 * | 5/2004 | Breed et al. ............... 280/735 |
| 6,744,820 B1 * | 6/2004 | Khairallah et al. ............... 375/257 |
| 2004/0019725 A1 * | 1/2004 | Ellerbrock et al. ............... 710/305 |
| 2005/0213559 A1 * | 9/2005 | O'Neill et al. ............... 370/351 |

FOREIGN PATENT DOCUMENTS

| | | |
|---|---|---|
| EP | 0 280 231 A2 | 8/1988 |
| EP | 0 802 655 A2 | 10/1997 |
| EP | 1 069 733 A2 | 1/2001 |
| JP | 10-154992 A | 6/1998 |

* cited by examiner

*Primary Examiner*—Chi H Pham
*Assistant Examiner*—Warner Wong
(74) *Attorney, Agent, or Firm*—Foley & Lardner LLP

(57) ABSTRACT

Disclosed is a multiplex communication system which comprises a master unit, and a plurality of slave units, wherein the master unit and the plurality of slave units are annularly connected by a signal line. The master unit transmits a request signal to each of the slave units via the signal line and receives a response signal in response to the request signal from each of the slave unit. An area for which the plurality of slave units can write data is set for the response signal output from the plurality of slave units.

10 Claims, 14 Drawing Sheets

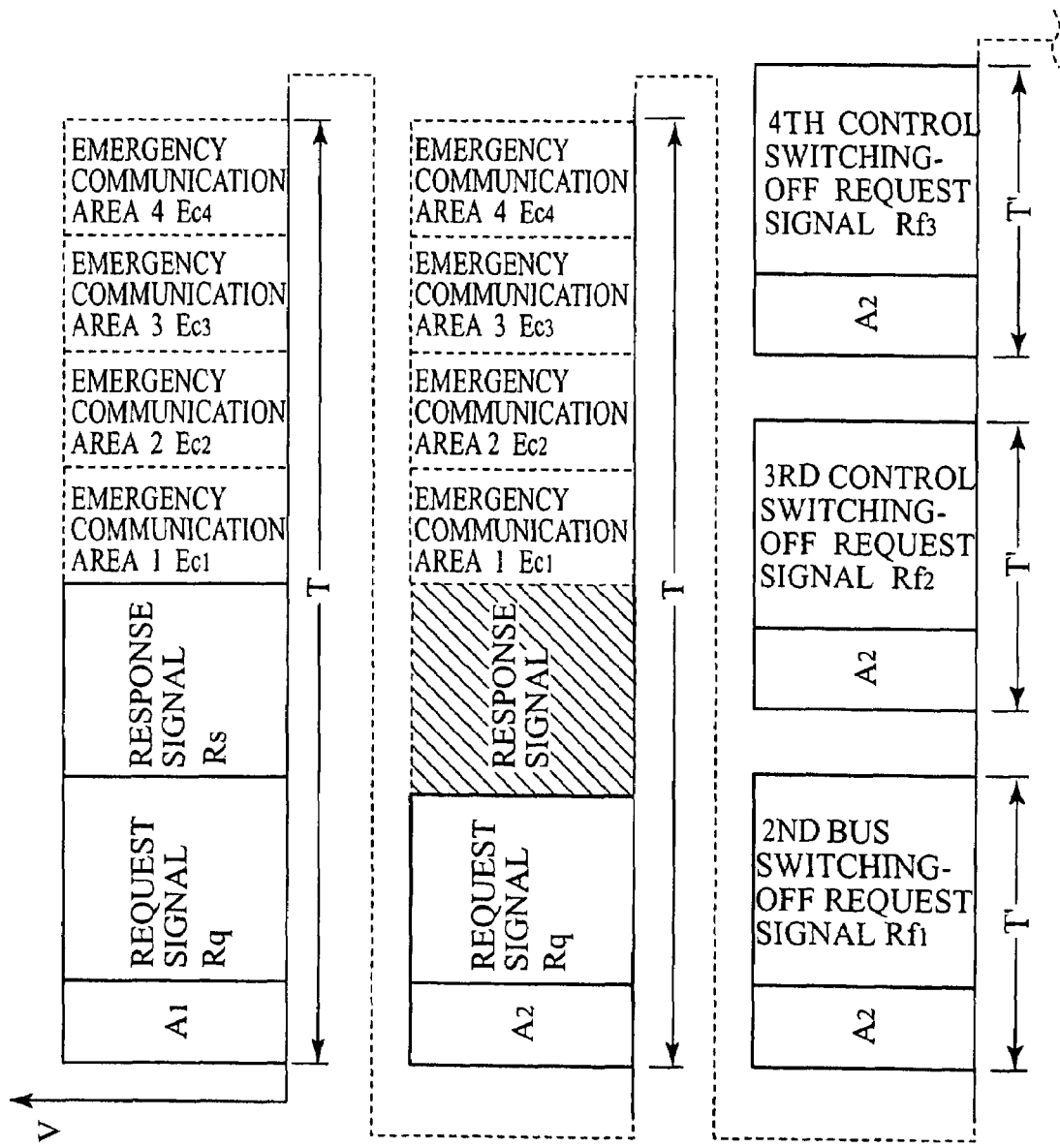

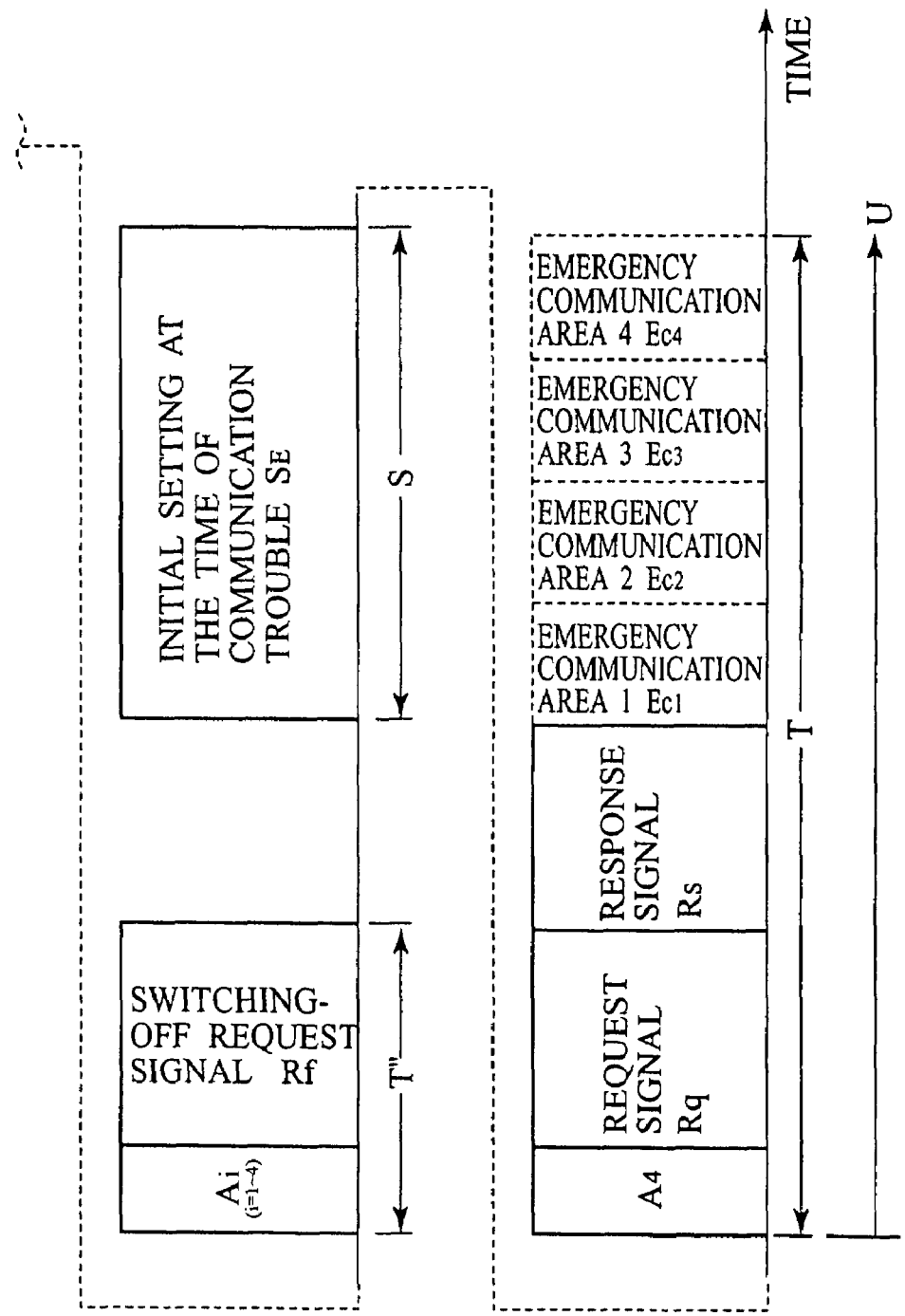

and 103N via a signal transmission bus 104. Squibs 105A, . . . , and 105N are coupled to the satellite units 103A, 103B, . . . , and 103N, respectively.

MULTIPLEX COMMUNICATION SYSTEM AND CAR-PASSENGER PROTECTION SYSTEM USING THE SAME

BACKGROUND OF THE INVENTION

The present invention relates to a multiplex communication system and a car-passenger protection system using the same. Conventionally, a multiplex communication system as shown in FIG. 1 is known. Specifically, a master unit 100 includes a microcomputer 101 and an acceleration sensor. The master unit 100 is coupled to a plurality of satellite units 103A, 103B, . . . , and 103N via a reference bus 102, and coupled to the plurality of satellite units 103A, 103B, . . . , and 103N via a signal transmission bus 104. Squibs 105A, . . . , and 105N are coupled to the satellite units 103A, 103B, . . . , and 103N, respectively.

The satellite units 103A to 103N are located on the side portion of a car such as a door panel apart from the master unit 100 positioned at the center of the car. Signals are respectively supplied to the satellite units 103A to 103N through the signal transmission bus 104 from the master units 100. Electric energy is supplied to each of the satellite units 103A to 103N by voltage multiplexing. A part of the electric energy transmitted to each of the satellite units 103A to 103N is used for allowing the satellite unit 103A to 103N to operate. Other parts are stored in the satellite unit 103A, and the electric energy stored in the satellite unit 103A is supplied to the squib 105A as ignition current when an airbag needs to be developed at the time of an accident. There is a technology disclosed in Japanese Patent Laid-Open No. 10(1998)-154992 as such a kind of prior art.

SUMMARY OF THE INVENTION

However, in the system having the above described construction, when any of the satellite units detects a collision, there has been a problem that the satellite unit, which detected the collision, cannot inform the master unit that the satellite unit detected the collision by transmitting a response signal until a signal for requesting to inform whether or not the collision happened is transmitted from the master unit to this satellite unit. Therefore, when the number of the satellite units increases, it takes much time to verify for the satellite units sequentially whether detection has been made or not. Accordingly, when a specific satellite unit detects a collision, there has been an apprehension that this specific satellite unit cannot inform the master unit of the detection of the collision by transmitting a response signal, at maximum until confirmation procedures for all of other satellite units have been completed.

The present invention was made to solve the above described problems, and an object of the present invention is to make it possible to transmit data, which must be transmitted immediately from a satellite unit to a master unit, immediately without delay when the data is transmitted.

According to a first aspect of the present invention, a multiplex communication system comprises a master unit and a plurality of slave units. The master unit and the plurality of slave units are coupled to each other by a signal line annularly. The master unit transmits a request signal to each of the slave units through the signal line, and receives a response signal in response to the request signal from each of the slave units. The response signal has a data area to which each of the slave units can write data.

According to a second aspect of the present invention, a car-passenger protection system comprises a master unit for judging a scale of collision from a first direction; a plurality of slave units include first and second slave units, the first slave unit judging a scale of collision from a second direction and the second slave unit judging a scale of collision from a third direction; and a squib operated by a control of the master unit, wherein the master unit and the plurality of slave unit are connected by a signal line annularly, and the master unit transmits a request signal to each of the slave units via the signal line and receives a response signal in response to the request signal from each of the slave units, and wherein the response signal has a data area to which each slave unit can write data, and data which indicate an occurrence of the collision is written to the data area when each slave unit detects the collision.

BRIEF DESCRIPTION OF THE DRAWINGS

FIGS. 7A to 7E are each a time chart for explaining the operation FIGS. 2 to 4.

DESCRIPTION OF THE PREFERRED EMBODIMENT

Figure 1:
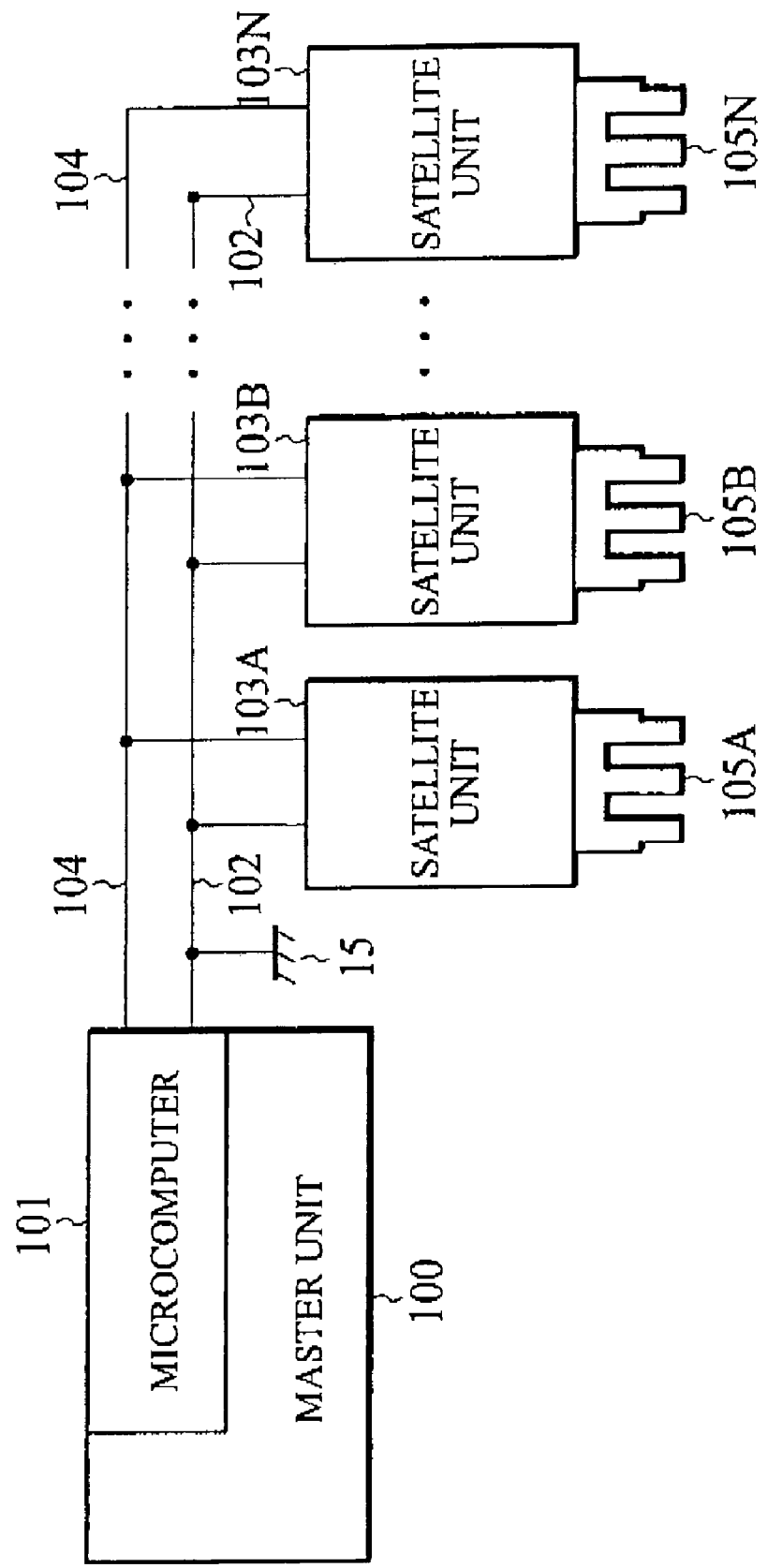
FIG. 1 is an explanatory view schematically illustrating the entire configuration of a conventional airbag unit.
Figure 2:
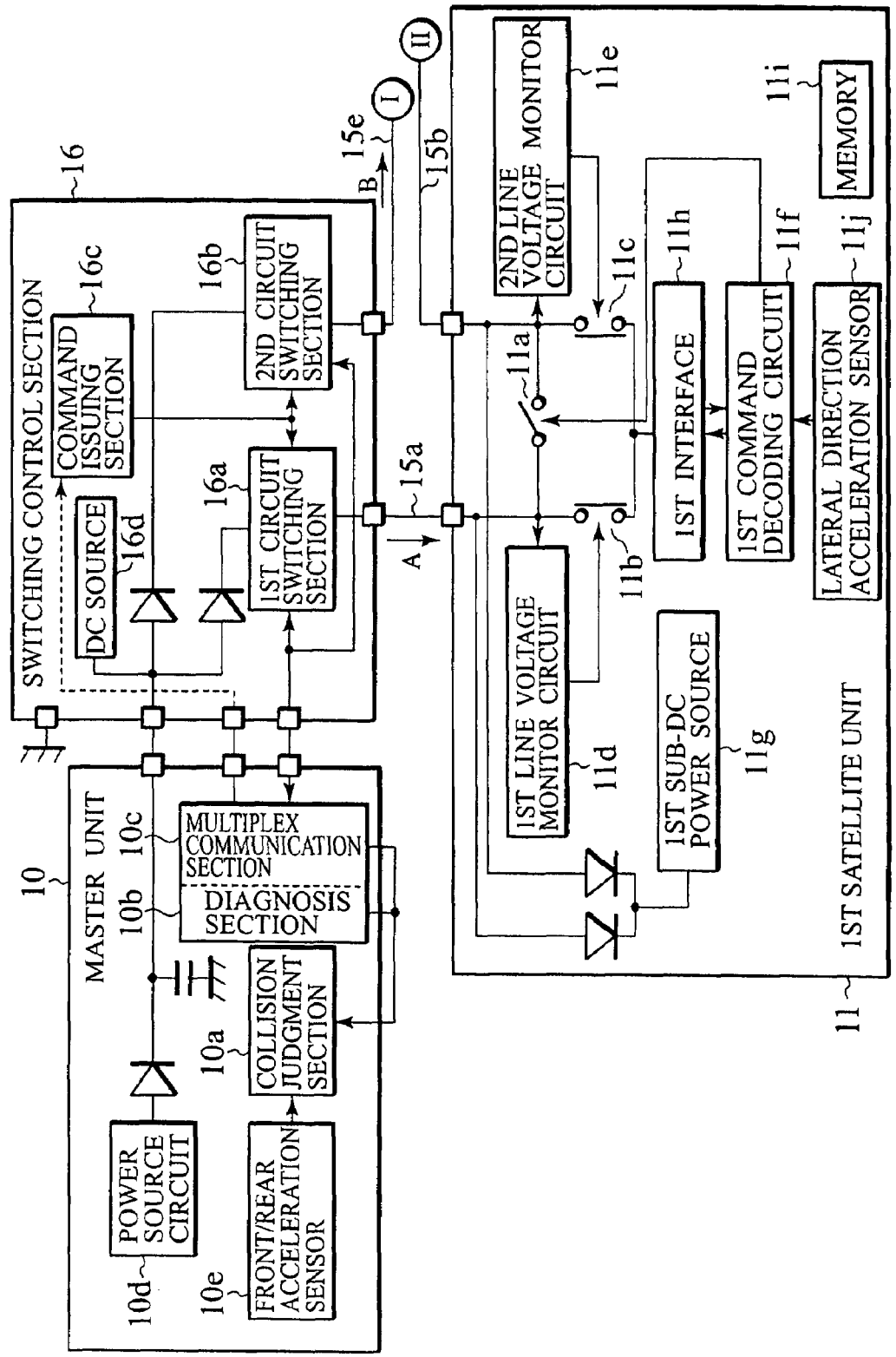
FIG. 2 is an explanatory view illustrating a circuit block of a car-passenger protection device for a car-passenger device using a multiplex communication circuit, which shows an embodiment of the present invention.
Figure 3:
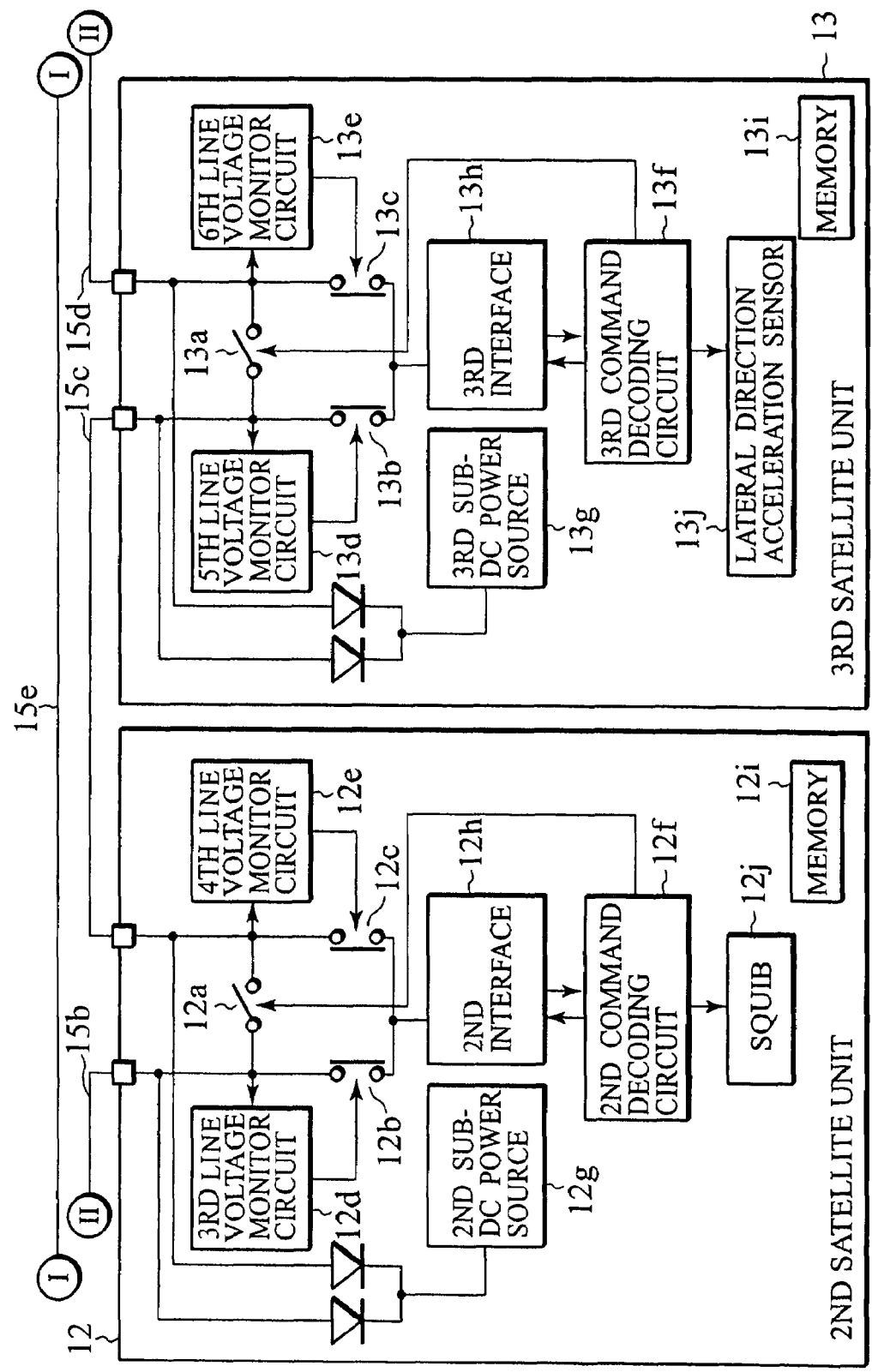
FIG. 3 is an explanatory view illustrating a circuit block of a car-passenger protection device using a multiplex communication circuit, which shows an embodiment of the present invention.
Figure 4:
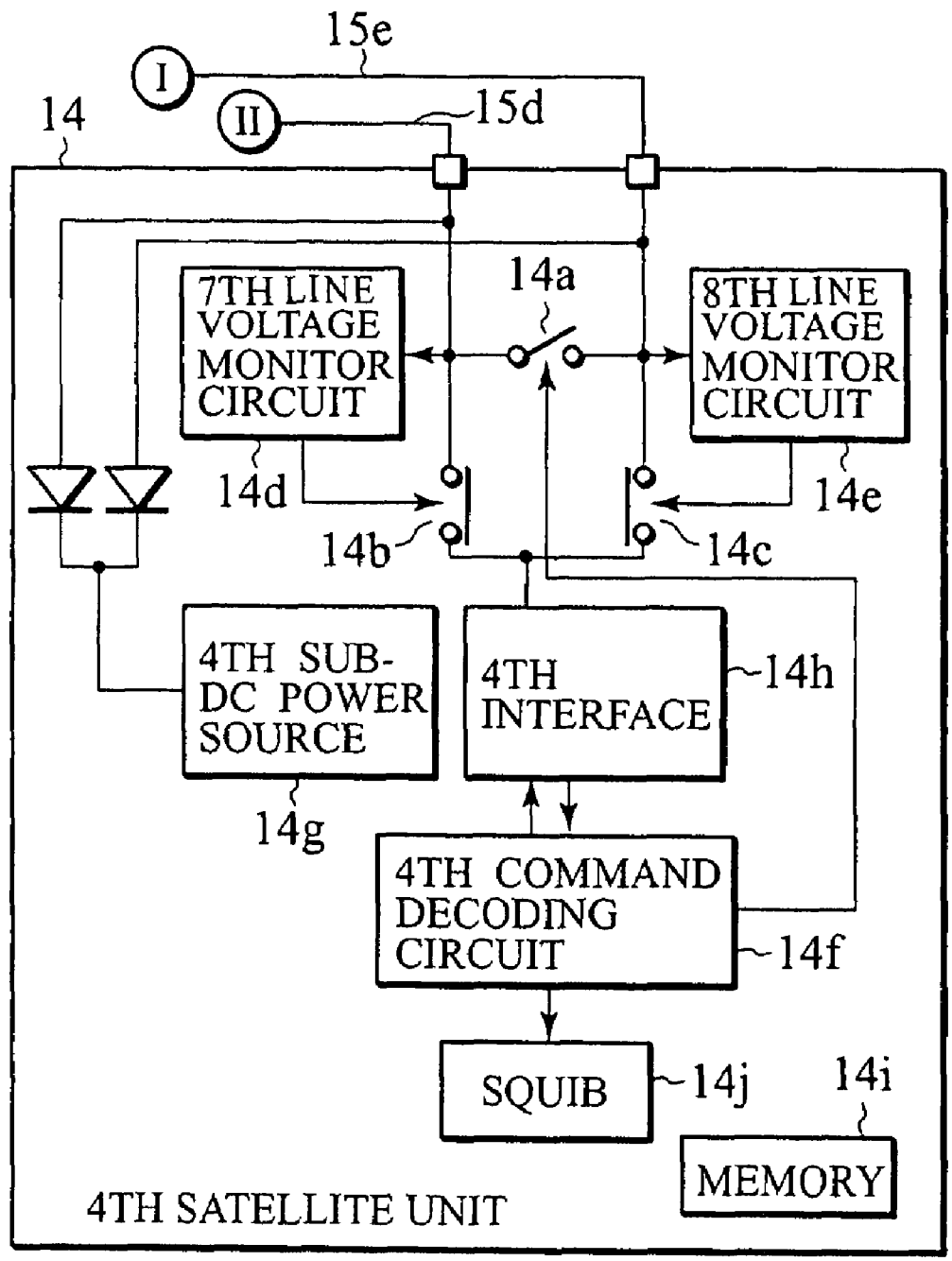
FIG. 4 is an explanatory view illustrating a circuit block of a car-passenger protection device using a multiplex communication circuit, which shows an embodiment of the present invention.

A multiplex communication system according to the preferred embodiment of the present invention is shown in FIG. 2, and FIG. 2 is a drawing illustrating a system configuration of an airbag control device (a car-passenger protection device).

For example, a first satellite unit 11 is a driver's seat-side acceleration sensor unit, a second satellite unit 12 is a driver's seat-side airbag developing and driving circuit, a third satellite unit 13 is a front seat-side acceleration sensor unit, and a fourth satellite unit 14 is a front seat-side developing and driving circuit. Although a switching control section 16 is illustrated in FIG. 2 as a different circuit block from the master unit 10, the switching control section 16 constitute a part of the master unit 10, practically.

The first to fourth satellite units 11 to 14 and the switching control section 16 are annularly and electrically coupled by one communication line 15 to be in the form of a voltage multiplex communication configuration. Power in which various signals containing data are superimposed is supplied from the master unit 10 to the first to fourth satellite units by the communication line 15 constituted by communication lines 15a to 15e coupled in series. Specifically, the communication line 15 serves also as a power supply line as well as the signal line. The first to fourth satellite units 11 to 14 constitute a slave unit.

Detailed configurations of the master unit 10, the switching control section 16 and the first to fourth satellite units 11 to 14 will be described.

The master unit 10 as a controller has approximately the same functions as the master 100 in the prior art. Specifically, the master unit 10 is constituted by a microcomputer including a collision judgment section 10a, a diagnosis section 10b, a multiplex communication section 10c, a power source circuit 10d, an acceleration sensor for the front and back direction 10e and the like. The diagnosis section 10b and the multiplex communication section 10c are coupled to the communication line 15a through a first circuit switching section 16a of a switching control section 16, and coupled to a communication line 15e through a second circuit switching section 16b.

The switching control section 16 comprises microcomputers providing a first circuit switching section 16a, the second circuit switching section 16b, a command issuing section 16c and the like and a DC power source 16d for supplying current to the microcomputers The command issuing section 16c alternately activates the first and second switching sections 16a and 16b based on instructions from the collision judgment section 10a and the diagnosis section 10b in the master unit 10. Then, upon power-on, based on instructions from the collision judgment section 10a and the diagnosis section 10b in the master unit 10, the command issuing section 16c superimposes a signal for supplying addresses and various request signals to the respective first to fourth satellite units 11 to 14, on a DC output from the power source circuit 10d, and outputs the superimposed signal to the communication line through one of the circuit switching section, which has been activated.

Figure 5:
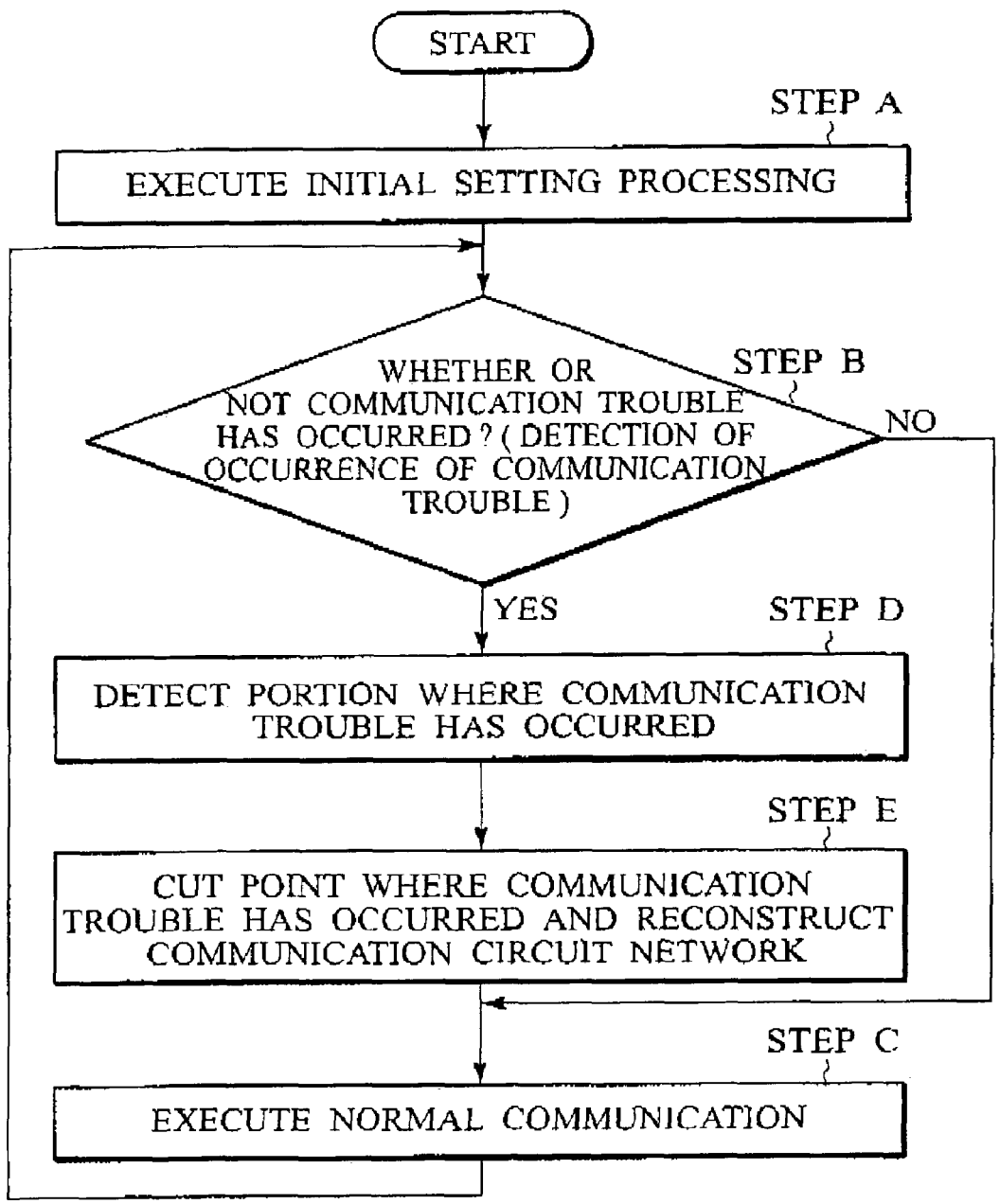
FIG. 5 is a flowchart of an operation of the devices illustrated in FIGS. 2 to 4.

After the command issuing section 16c activates the first circuit switching section 16a, the command issuing section 16c executes an initial setting processing A in the flowchart as illustrated in FIG. 5. When it is judged to be normal, the procedure advances to a communication trouble detection processing B followed by a normal communication processing C.

In the initial setting processing A, when the diagnosis section 10b of the master unit 10 judges that communication failure has occurred in any of the communication line 15 or the first to fourth satellite units 11 to 14, then the command issuing section 16c inactivates the first circuit switching section 16a and, at the same time, activates the second circuit switching section 16b, based on the instruction of the diagnosis section 10b of the master unit 10, and proceeds to the initial setting processing A, the communication trouble detection processing B, the normal communication processing C, the communication trouble occurrence point detection D, and the communication trouble occurrence point cutting and communication reconstruction E according to the flowchart as illustrated in FIG. 5.

When it is judged that communication failure has occurred in any of the communication line 15 and the first to fourth satellite units 11 to 14 during the normal communication, the command issuing section 16c inactivates, for example, the first circuit switching section 16a and, at the same time, activates the second circuit switching section 16b, based on the instruction of the diagnosis section 10b of the master unit 10, and proceeds to the initial setting processing A, the communication trouble detection processing B, the normal communication processing C, the communication trouble occurrence point detection D, and the communication trouble occurrence point cutting and communication reconstruction E according to the flowchart as illustrated in FIG. 5.

On the contrary, when the second circuit switching section 16b is activated, the first circuit switching section 16a is simultaneously activated.

The first satellite unit 11 comprises a first bus switch (first switching means) 11a, a first control switch (second switching means) 11b, a second control switch (third switching means) 11c, a first line voltage monitor circuit 11d, a second line voltage monitor circuit 11e, a first interface 11h, a first command decoding circuit (constituted by a microcomputer) 11f, a first sub-DC power source 11g, and the like. The first bus switch 11a is arranged between the communication lines 15a and 15b coupled in series. In addition, the first and second control switches 11b and 11c are coupled in series, and the series circuit composed of the first and second control switches 11b and 11c is coupled to the first bus switch in parallel.

The first line voltage monitor circuit 11d monitors the voltage of the signal line 15a coupled to one 110 terminal of two I/O terminals of the first satellite unit 11, and detects the trailing edge of a voltage of the first address signal from the command issuing section 16c, which was superimposed on the first constant voltage obtained after the power source circuit 10d in the master unit 10 begins to operate, thus turning on the first control switch 11b.

The second line voltage monitor circuit 11e is coupled to the other I/O terminal of the first satellite unit 11, and monitors the voltage of the signal line 15b which is obtained after resetting the first to fourth satellite units 11 to 14 when communication trouble occurs in the communication line 15 or any of the first to fourth satellite units 11 to 14 after the operation start of the power source circuit 10d in the master unit 10. Then, by the instruction of the switching control section 16, the second circuit voltage monitor circuit 11e detects the trailing edge of the voltage of the first address signal to be voltage-multiplexed on the signal line 15b, turning on the second control switch 11c.

The first interface 11h has an I/O terminal coupled to the connection node of the first and second control switches 11b and 11c coupled to each other in series. Upon receipt of the address signal and the request signal from the communication line 15, the first interface 11h supplies the address signal and the request signal to the first command decoding circuit 11f, and outputs a response signal and an airbag developing request signal, which are output from the first command decoding circuit 11f, onto the communication line 15.

When the address signal is supplied to the first command decoding circuit 11f, the first command decoding circuit 11f allows the master unit 10 and the switching control section 16 to store the address signal as an inherent address signal in the memory 11i, this address signal being for discriminating its own unit (first satellite unit 11) from the first to fourth satellite units 12 to 14, and performs the initial setting, thus turning ON the first bus switch 11a.

The first command decoding circuit 11f makes self-diagnosis for the first unit satellite 11 always. When the request signal is supplied to the first command decoding circuit 11f, the first command decoding circuit 11f outputs the result of the self-diagnosis result to the first interface 11h. On the other hand, as the result of the self-diagnosis, when it is judged that communication trouble has occurred in its own circuit, that is, the first satellite unit 11, the first command decoding circuit 11*f* turns-off the first bus switch 11*a*, the first control switch 11*b* and the second control switch 11*c*, and abandons the address stored in the memory 11*i*. Furthermore, the first command decoding circuit 11*f* makes the first sub-DC power source 11*g* compulsorily inoperative, and allows the charges stored in a capacitor constituting the first sub-DC power source 11*g* to discharge, thus disabling the first sub-DC power source 11*g* from restarting. Accordingly, a possibility of an occurrence of a malfunction is completely removed. Specifically, an initial setting is performed.

The third satellite unit 13 also has the same configuration as that of the first satellite unit 11. A third bus switch) 13*a* corresponds to the first bus switch 11*a* of the first satellite unit 11, and a fifth control switch 13*b* corresponds to the first control switch 11*b* of the first satellite unit 11. A sixth control switch 13*c* corresponds to the second control switch 11*c* of the first satellite unit 11. A fifth line voltage monitor circuit 13*d* corresponds to the first line voltage monitor circuit 11*d* of the first satellite unit 11, and a sixth line voltage monitor circuit 13*e* corresponds to the second line voltage monitor circuit 11*e* of the first satellite unit 11. A third interface 13*h* corresponds to the first interface 11*h* of the first satellite unit 11, and a third command decoding circuit 13*f* corresponds to the first command decoding circuit 11*f* of the first satellite unit 11. A third sub-DC source 13*g* corresponds to the first sub-DC source 11*g* of the first satellite unit 11.

The second and fourth satellite units 12 and 14 have the same configurations as that of the first satellite unit 11. Second and fourth bus switches 12*a* and 14*a* correspond to the first bus switch 11*a* of the first satellite unit 11, and third and seventh control switches 12*b* and 14*b* correspond to the first control switch 11*b* of the first satellite unit 11. Fourth and eighth control switches 12*c* and 14*c* correspond to the second control switch 11*c* of the first satellite unit 11, and third and seventh line voltage monitor circuits 12*d* and 14*d* correspond to the first line voltage monitor circuit 11*d* of the first satellite 11. Fourth and eighth line voltage monitor circuits 12*e* and 14*e* correspond to the second circuit voltage monitor circuit 11*e* of the first satellite unit 11, and second and fourth interfaces 12*h* and 14*h* correspond to the first interface 11*h* of the first satellite unit 11. Second and fourth command decoding circuits 12*f* and 14*f* correspond to the first command decoding circuit 11*f* of the first satellite unit 11, and second and fourth sub-DC power sources 12*g* and 14*g* correspond to the first sub-DC source 11*g* of the first satellite unit 11.

The first and third satellite units 11 and 13 and the second and fourth satellite units 12 and 14 differ in that acceleration sensors 11 and 13*j* are provided with the first and third satellite units 11 and 13, and squibs 12*j* and 14*j* as an igniter are provided in the second and fourth satellite units 12 and 14 instead of the acceleration sensors 11*j* and 13*j*.

Figure 8A:
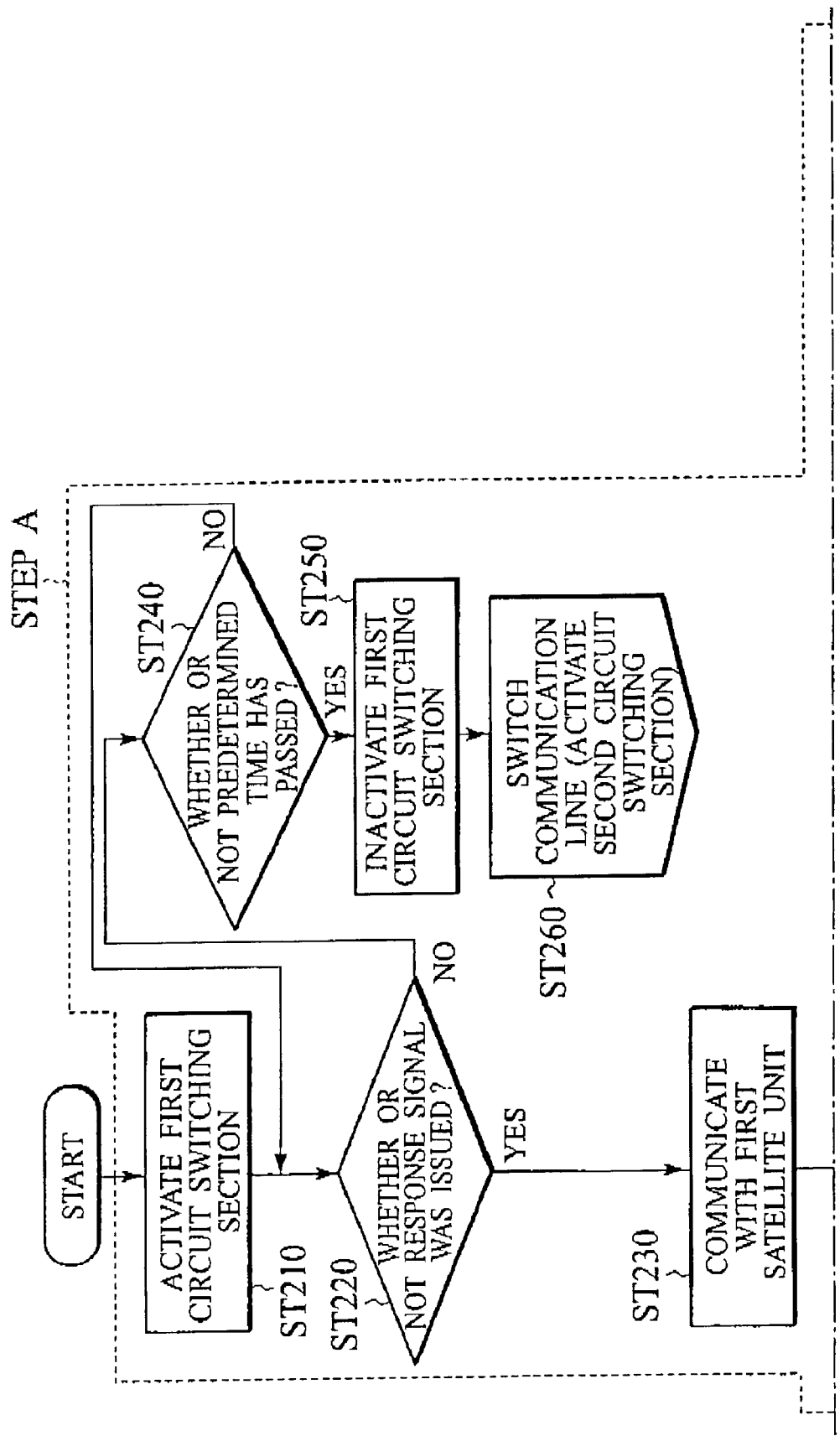
FIG. 8(8A to 8C) is a flowchart at the time the devices illustrated in FIGS. 2 to 4 are initially set.
Figure 8B:
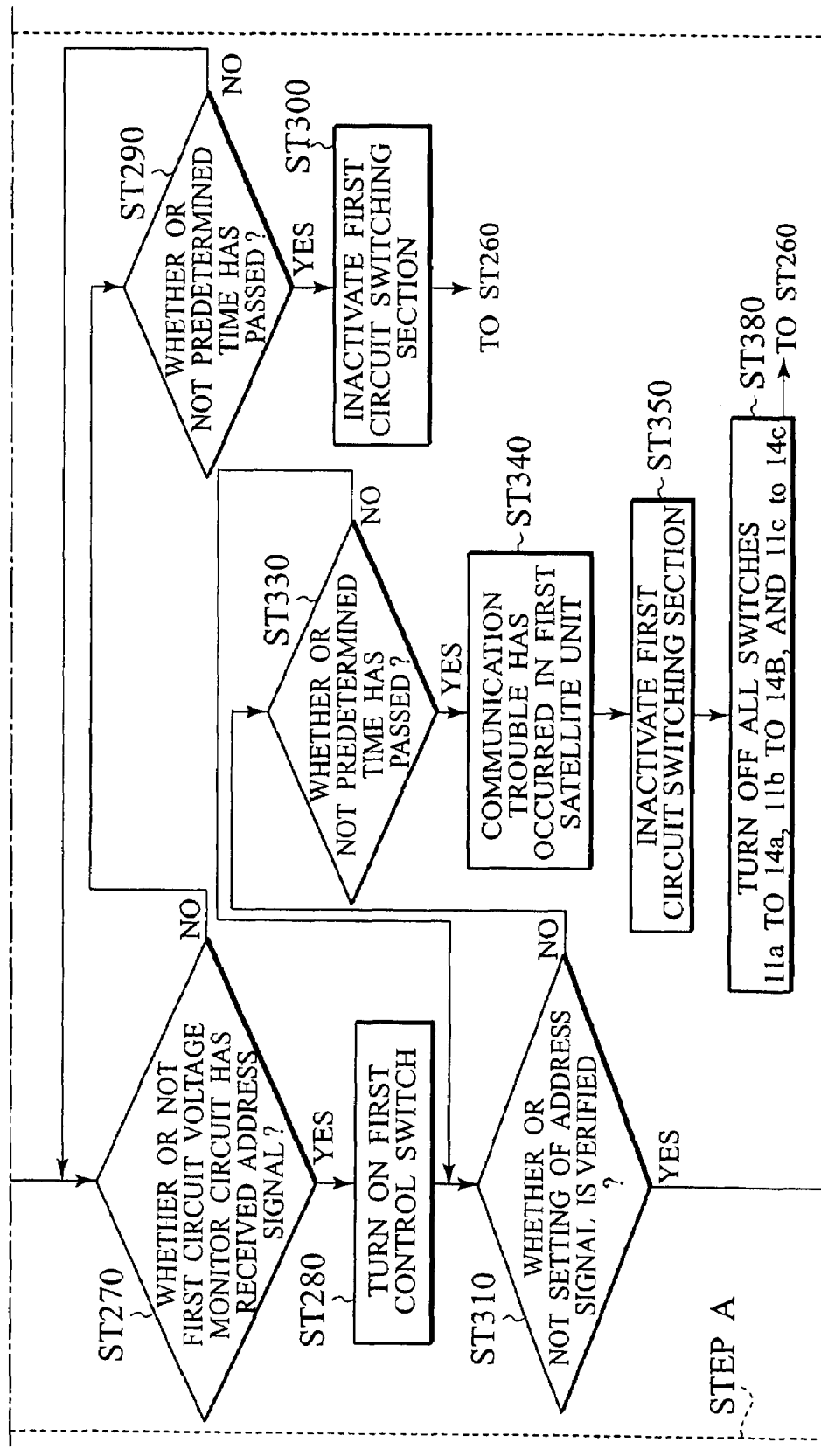
Figure 8C:
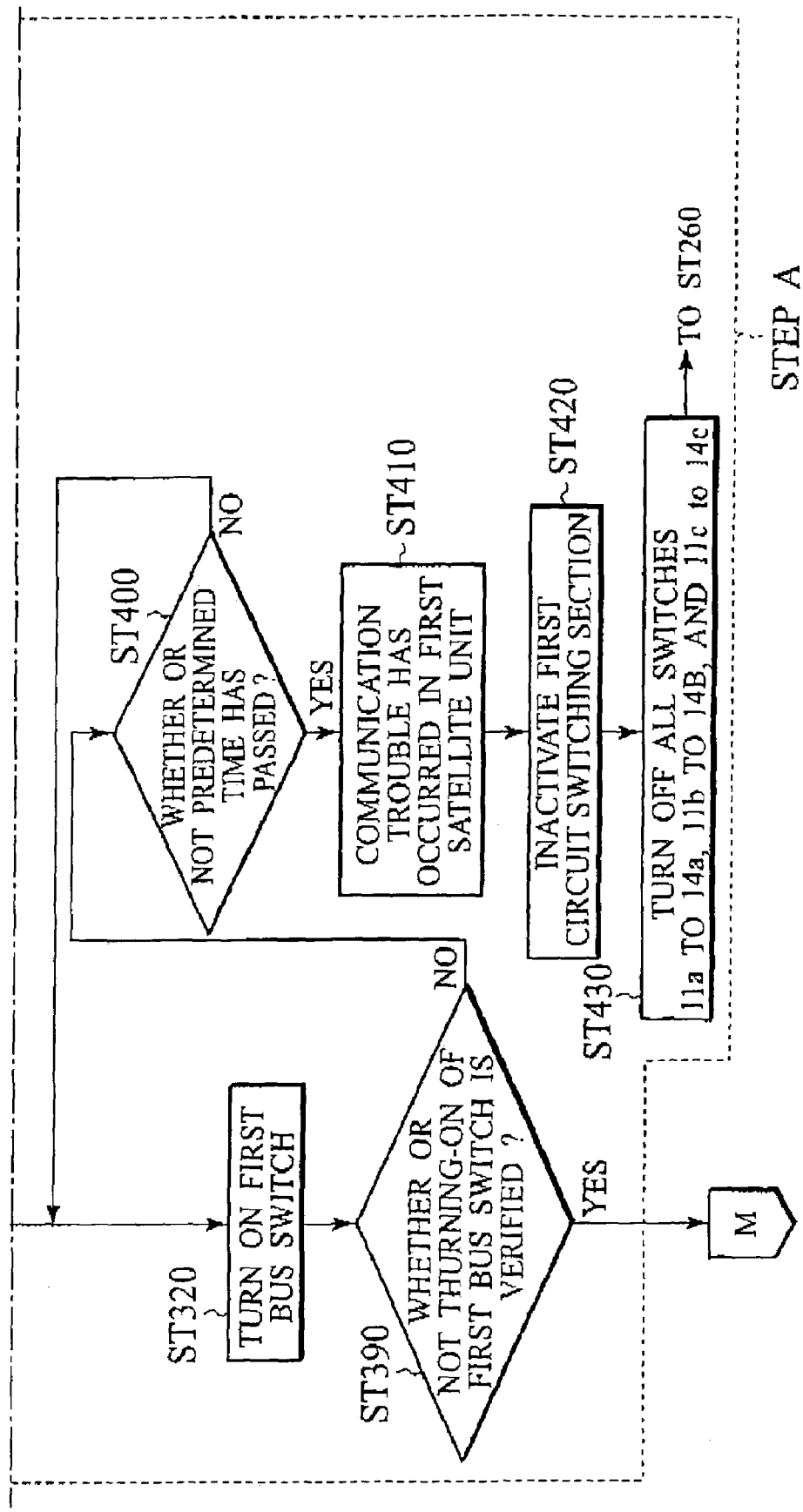
Figure 9:
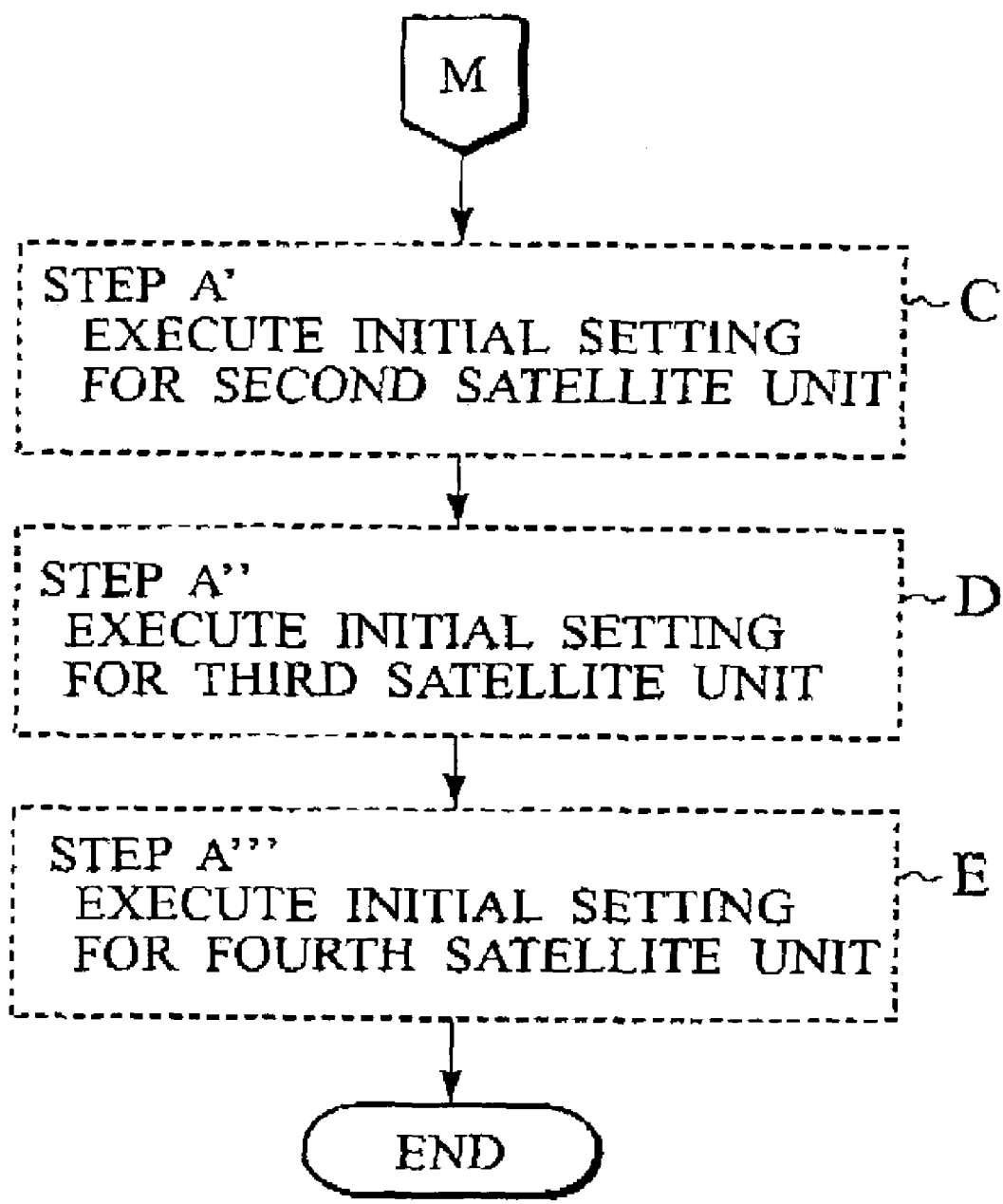
FIG. 9 is a flowchart at the time the devices illustrated in FIGS. 2 to 4 are initially set.

The outline of the control for the switching control section 16 of the master unit 10 is illustrated in the flowchart of FIG. 5, and the detailed flowcharts of each block in this flowchart are illustrated in FIGS. 8 and 9.

First, the description for the total outline of the communication function of the master unit 10 will be made based on the flowchart illustrated in FIG. 5.

After the initial setting processing A is performed accompanied with the power-on, the procedure advances to the next step B.

The communication trouble detection processing is first performed in step B, and thus it is detected whether the communication trouble has occurred. When it is judged that the communication trouble has not occurred, the operation of the normal communication processing is performed in next step C. When it is judged in step B that the communication trouble has occurred, the communication trouble occurrence point detection processing is performed in next step D, and an abnormal point where the communication trouble has occurred is decided. In next step E, the communication trouble point cutting processing to cut off the communication trouble occurrence point, that is, an abnormal point, from the multiplex communication link and the reconstruction processing of the communication circuit network are performed, and then the procedure advances to the normal communication processing of step C. After completion of step C, the procedures returns to step B, and steps C, D and E are repeatedly executed. Descriptions for steps will be described below.

Initial Setting Processing

The communication trouble occurrence detection in the initial setting processing in step A of FIG. 5 will be described.

When the procedure advances to step A for this initial setting processing, the command issuing section 16*c* activates the first circuit switching section 16*a*. On the other hand, the command issuing section 16*c* inactivates the second circuit switching section 16*b*, and outputs an address and request signal of the first satellite unit 11 onto the signal line 15*a*. A response signal in response to the request signal, the response signal being supplied from the first satellite unit 11 and indicating that the communication circuit is normal is confirmed. The same operation as this confirmation operation is sequentially performed for the second to fourth satellite units 12 to 14 by accessing to them, and the diagnosis as to whether the communication trouble has occurred is performed for them, respectively. The procedure advances to next step B.

Specifically, for the communication between the master unit 10 and the first to fourth satellite units 11 to 14, the predetermined time T per one frame is given as a setting value, and one frame is basically composed of the portion of the address signal A, the portion of the request signal Rq, and the portions of the first to fourth satellite emergency communication areas Ec1 to Ec4.

The operation of the multiplex communication system will be concretely described based on the flowchart illustrated in FIG. 8. When the power source is turned on, in step A, the command issuing section 16*c* activates only the first circuit switching section 16*a* in response to the instruction from the command issuing section 16*c*, in order to transmit the output signal (the address signal A, and the request signal Rq) from the command issuing section 16*c* in, for example, the clockwise direction (the A-direction illustrated in FIG. 2) (step ST210). When the first circuit switching section 16*a* is normally activated, the command issuing section 16*c* outputs the address signal A and the request signal Rq sequentially to the first to fourth satellite units 11 to 14. Herein, since the initial setting processing for each of the first to fourth satellite units 11 to 14 is performed in the same manner, the processing for the first satellite unit 11 is representatively described below. First, the command issuing section 16*c* verifies the response signal Rs which is output from the first satellite unit 11 in response to the request signal Rq (step ST220), the response signal Rs indicating that the communication circuit is in a normal state. When it is judged that it is possible to perform the communication normally, a signal Rs indicating that it is possible to perform the communication normally is supplied to the diagnosis section 10*b* of the master unit 10, and the procedures advances to step ST230 of step B.

On the other hand, when the diagnosis section 10*b* judges that the signal Rs indicating that the communication is performed normally is not confirmed after waiting for the signal Rs for a predetermined time (steps ST220-NO and ST240-YES), the diagnosis section 10*b* instructs the command issuing section 16c to inactivate the first circuit switching section 16a (step ST250). Alternatively, the diagnosis section 10b instructs the command issuing section 16c to activate the second circuit switching section 16b (step ST260). As a result, the output signal (the address signal and the request signal) from the command issuing section 16c is transmitted, for example, in the counterclockwise direction (the B-direction illustrated in FIG. 2). Specifically, the diagnosis which is performed in the same manner as that for the first circuit switching section 16a is performed for the second circuit switching section 16b in the reverse order as illustrated in FIG. 6B, that is, in the order of the fourth satellite unit 14 (fourth frame F4), the third satellite unit 13 (third frame F3), the second satellite unit 12 (second frame F2), and the first satellite unit 11 (first frame F1).

In step ST230, the command issuing section 16c allows the first circuit switching section 16a to output the address signal A and the request signal Rq to communicate with the first satellite unit 11 onto the communication line 15 while superimposing them on the power source voltage. In step ST270, it is judged whether the first circuit voltage monitor circuit 11d of the first satellite unit 11 has received the address signal and the request signal from the communication line 15a. When it is judged based on the response signal RS that the address signal A and the request signal Rq have been received, the procedure advances to step ST280.

On the other hand, when it is judged that the first circuit voltage monitor circuit 11d has not received the address signal A and the request signal Rq yet, steps ST270 and ST290 are executed repeatedly to wait for the acceptance of the address signal A and the request signal Rq while a predetermined time passes. When it is judged that the address signal A and the request signal Rq are not received after the passage of the predetermined time, the procedures advances to step ST300. In step ST300, the diagnosis section 10b instructs the command issuing section 16c to inactivate the first circuit switching section 16a (step ST300), and the procedures advances to step ST260. Alternatively, the diagnosis section 10b instructs the command issuing section 16c to activate the second circuit switching section 16b.

In step ST270, when the first circuit voltage monitor circuit 11d receives the first voltage change of the signal indicating the address, the first control switch 11b is changed to be in ON in step ST280, and the address signal and the request signal are supplied to the first command decoding circuit 11f.

When the address signal and the request signal supplied to the first decoding circuit 11f is normally decoded and the address signal is stored in the memory 11i, the procedure advances to step ST310. And the response signal Rs indicating that decoding and storing are normally performed is outputted from the first command decoding circuit 11f onto the communication line 15a via the first interface 11h. The response signal Rs is sent back to the diagnosis section 10b of the master unit 10. When it is judged by the diagnosis section 10b that the response signal is received, the procedures advances to step ST320 from step ST310.

However, when it is judged that the response signal Rs is not received, the response signal Rs is waited for a predetermined time in step ST330. When the response signal Rs is not received after waiting the response signal Rs for the predetermined time, a signal indicating the occurrence of the communication trouble is supplied to the diagnosis section 10b (step ST340), and the diagnosis section 10b instructs the command issuing section 16c to inactivate the first circuit switching section 16a (step ST350). The instruction to turn OFF all of the switches 11a to 14a, 11b to 14b, 11c to 14c, and 11d to 14d of the first to fourth satellite units 11 to 14 is made (step ST380), and the procedure advances to step ST260.

In step ST310, when the address signal is stored in the memory 11i and the procedure advances from step ST310 to step ST320, a signal to turn ON the first bus switch 11a of the first satellite unit 11 is issued from the command issuing section 16c to the first circuit switching section 16a, whereby the first circuit switching section 16a is requested to output the address signal and the request signal onto the communication line 15, these signals indicating the instruction to turn ON the first bus switch 11a. The first command decoding circuit 11f of the first satellite unit 11 recognizes it, and turns ON the first bus switch 11a. When it is confirmed by the diagnosis section 10b that the first bus switch 11a is turned ON (step ST390), the procedure advances to the initial setting processing for the second satellite unit 12, which is illustrated in FIG. 9 as step A'.

The flowchart of step A' is executed substantially in the same manner as step A performed for the first satellite unit 11.

On the other hand, when the response signal (which is output from the first command decoding circuit 11f onto the communication line 15a via the first interface 11h, and sent back to the diagnosis section 10b of the master unit 10) is waited by the diagnosis section 10b for a predetermined time and the response signal is not sent back (step ST390-NO, step ST400-YES), it is judged that communication trouble has occurred in the first satellite unit 11 (step ST410), and the diagnosis section 10b instructs the command issuing section 16c to inactivate the first circuit switching section 16a (step ST420). In step ST430, the instruction to turn OFF all of the switches 11a to 11e, 12a to 12e, 13a to 13e, and 14a to 14e of the first to fourth satellite units 11 to 14 is made, and the procedure advances to step ST260.

Thereafter, the procedure advances to step A' of FIG. 9, and the initial setting processing for the second satellite unit 12 is performed. When the initial setting processing is completed, the procedure advances to step A" of FIG. 9. Also when the procedure advances to the initial setting processing of the third satellite unit 13, and also when the procedure advances to step A''' of the initial setting processing for the fourth satellite unit 14 after the initial setting processing for the fourth satellite unit 14, the same step is sequentially executed in the same manner as described above. When the steps are normally completed, the procedure advances to the communication trouble detection processing of step B in FIG. 5.

However, as described above, if the initial setting processing to perform the communication in the order of the first, second, third and fourth satellite units 11 to 14 could not be executed, the initial setting processing is executed in the reverse direction to the above, that is, the first circuit switching section 16a is inactivated and the second circuit switching section 16b is activated. As shown in FIG. 6B, the initial setting processing to perform the communication in the order of the fourth, third, second and first satellite units 14 to 11 is executed, and the procedure advances to the normal communication. When both of the first and fourth satellite units 11 and 14 cause the communication trouble, the initial setting processing is not performed, and the system fails in an ability to perform the communication.

The communication trouble detection processing is performed by recognizing the point judged to be incapable of performing the communication by performing the same processing as that performed in step A of FIG. 5.

Normal Communication Processing

As a result of the foregoing initial setting processing, when it is judged that the communication is performed normally, the normal communication processing (step C of FIG. 5) to be described below is performed in accordance with the flowchart based on FIG. 10.

The normal communication processing is performed in the same communication method as the communication at the time of a star connection In the multiplex communication. The detail of the normal communication processing is described below.

Accompanied with the powered on by turning ON an ignition switch, when the master unit 10 starts to operate in the state where the first circuit switching section 16a is usually operative and the second circuit switching section 16b is inoperative, the procedures advances to step ST500. Specifically, the multiplex communication section 10c performs the communication sequentially with the first, second, third and fourth satellite units 11 to 14 via the communication line 15a, in which the address signal A, the request signal Rq, the response signal Rs and the satellite emergency communication areas $E_{C1}$, $E_{C2}$, $E_{C3}$ and $E_{C4}$ shown in FIG. 6C are packed in one frame, and a satellite unit for which this communication is performed is assigned by an address signal supplied to the communication line 15a at this time.

Specifically, if the supplied address signal coincides with an address signal stored in the memory 11i of the first satellite unit 11 in the initial setting processing (step ST510), the multiplex communication section 10c performs the communication with the first satellite unit 11. If the supplied address signal coincides with an address signal stored in the memory 12i of the second satellite unit 12 (step ST510), the multiplex communication section 10c performs the communication with the second satellite unit 12.

The multiplex communication section 10c performs the communication in the same manner for the third and fourth satellite units 13 and 14, respectively.

As a typical example, the communication between the diagnosis section 10b and the first and second satellite units 11 and 12 will be described.

Figure 6A:
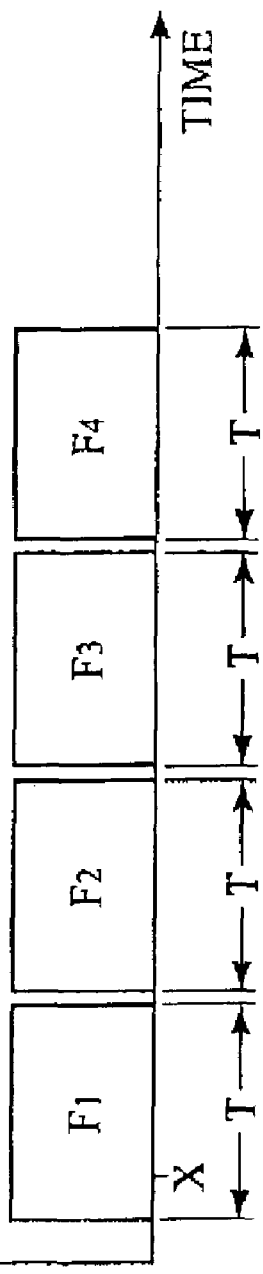
FIGS. 6A to 6D are each a time chart for explaining the operation FIGS. 2 to 4, FIG. 6A for initial setting during normal communication, FIG. 6B for initial setting during trouble communication, FIG. 6C for normal communication, and FIG. 6D for trouble communication.
Figure 6B:
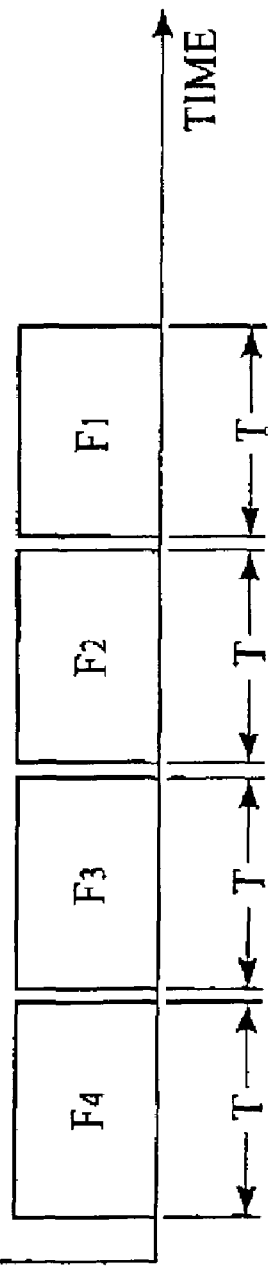
Figures 6C, 6D:
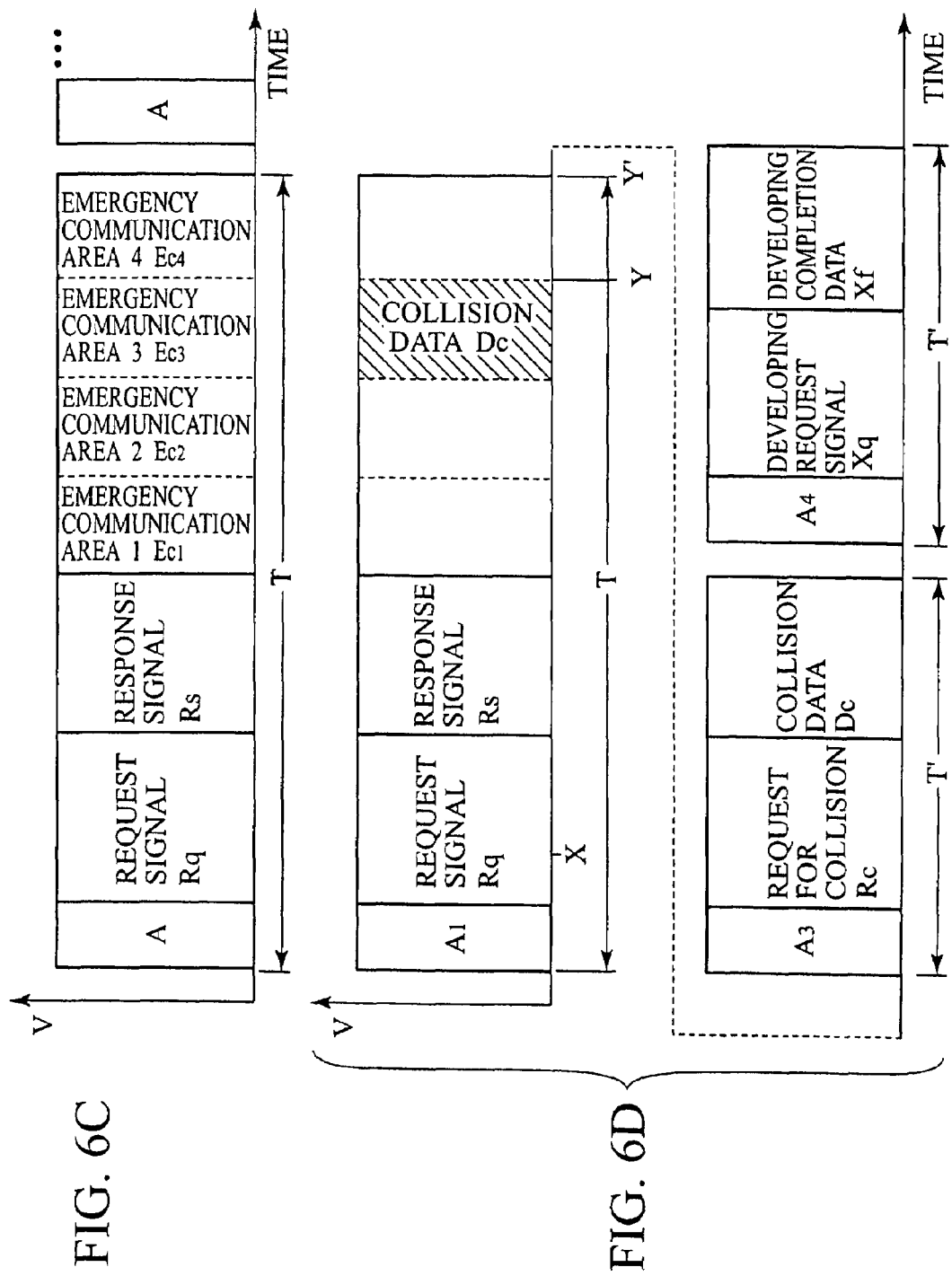

In the first satellite unit 11, the request signal of the first frame illustrated in FIG. 6A, that is, the request signal Rq illustrated in FIG. 6C, is supplied to the first satellite unit 11, and the first command decoding circuit 11f decodes the request signal. When the response signal Rs (see FIG. 6C) in response to the request signal is supplied to the diagnosis section 10b from the first satellite unit 11 via the multiplex communication section 10c after passing through the communication line 15a, diagnosis as to whether the communication trouble has occurred in the first satellite unit 11 and on the communication line 15a is performed in the diagnosis section 10b.

Then, this diagnosis is performed also for the second satellite unit 12 in the same manner as that for the first satellite unit 11. The response signal Rs is supplied to the diagnosis section 10b from the multiplex communication section 10c, and diagnosis as whether the communication trouble has occurred in the second satellite unit 12 is performed.

Figure 10:
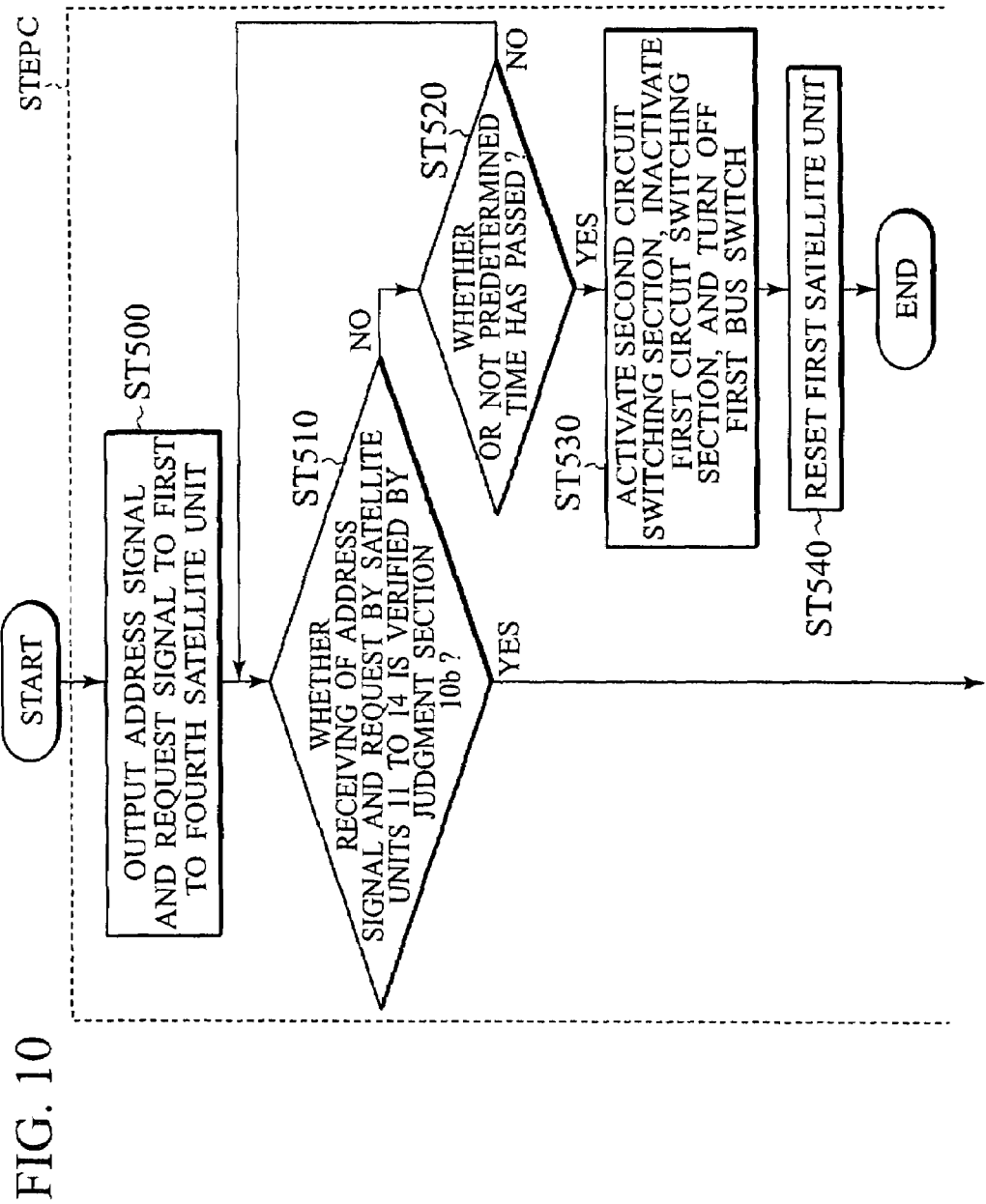
FIG. 10 is a flowchart during normal operations of the devices illustrated in FIGS. 2 to 4.

In the initial setting processing illustrated in step A of FIG. 10, when the confirmation for the first circuit switching section 16a is not performed even after a predetermined time is needed (step ST520), the procedure advances to step ST530. In step ST530, the second circuit switching section 16b becomes operative, and the first circuit switching section 16a becomes inoperative. In this state, when the master unit 10 starts to operate, the communication is performed in the order of the fourth, third, second and first satellite units 14 to 11 (step ST540).

Communication When Collision Occur in Normal Communication

The communication with the second satellite unit 12 will be described. For example, when the communication between the diagnosis section 10b and the first satellite unit 11 is performed in the normal communication processing, the case where the third satellite unit 13 detects that something collided against the car from its transverse direction (right or left of the car) at the time X in FIG. 6A will be described as an example below.

At the time X while the communication of the request signal and the response signal is being performed between the diagnosis section 10b and the first satellite unit 11, when the third satellite unit 13, for example, detects the collision from the transverse direction of the car by the transverse direction acceleration sensor 13j, the third command decoding circuit 13f of the third satellite unit 13 writes collision data $D_c$ in the specific third satellite emergency communication area $E_{c3}$ as shown in FIG. 6, the collision data indicating that the collision from the transverse direction of the car has occurred (the shaded area of FIG. 6D).

When the collision judgment section 10a of the master unit 10 receives the collision data Dc written in the specific area, the collision judgment section 10a skips the section Y-Y' and the communication with the second satellite unit 12 in order to start the multiplex communication with the third satellite unit 13 which transmits the data indicating the occurrence of the collision. The collision judgment section 10a supplies the address signal and the request signal illustrated in the first section T' of FIG. 6D to the third satellite unit 13 via the communication lines 15c to 15a.

As a result, the third command decoding circuit 13f of the third satellite unit 13 supplies the response signal indicating the occurrence of the collision to the collision judgment section 10a via the first circuit switching section 16a, and, against other developing conditions, the collision judgment section 10a checks the fact that the third satellite unit 13 detected the collision. As a result, when the collision judgment section 10a judges that the third satellite unit 13 detected the collision, the collision judgment section 10a supplies the request signal to the fourth satellite unit 14 via the signal line 15a to 15d for developing the side airbag, which makes a pair with the third satellite unit 13. This request signal attaches an address of the fourth satellite unit 14 thereto, and corresponds to the address signal A4 and the request signal Xq illustrated in the second section T' from the left side of FIG. 6D. Furthermore, this signal instructs the fourth satellite unit 14 to perform a squib ignition. The fourth satellite unit 14 supplies an ignition signal to a squib 14j and allows the airbag to develop itself. The fourth satellite unit 14 sends back the developing completion data Xf to the multiplex communication section 10c as the response signal.

The fourth command decoding circuit 14f of the fourth satellite unit 14 reads out the request signal Xq to perform the squib ignition via the communication lines 15a to 15d. When the fourth command decoding circuit 14f decodes the request, the fourth command decoding circuit 14f supplies ignition current to the squib 14j, and allows the squib 14j to develop the side airbag.

When it is judged during the normal communication processing that the communication trouble has occurred during the communication between the multiplex communication 10c of the master unit 10 and the first to fourth satellite units 11 to 14, the procedure advances to the communication trouble detection processing of step D and the communication trouble point cutting processing and the reconstruction processing of step E, which are illustrated in the flowchart of FIG. 5.

Communication Trouble Detection Processing, Communication Trouble Point Cutting Processing, and Reconstruction Processing The procedures described above are performed sequentially for the first satellite unit 11, the second satellite unit 12, the third satellite unit 13 and the fourth satellite unit 14, and performed substantially in the same manner. Accordingly, a processing only for the first satellite unit 11 will be representatively made below. This processing is for steps D and E of FIG. 5. The total of the flowchart is described, and then its concrete example is described.

In FIG. 10, in step ST500, the command issuing section 16c allows the first circuit switching section 16a to output the address signal Al and the request signal Rq in the first satellite unit 11, and judges whether or not the response signal Rs in response to the request signal is sent back thereto within a predetermined time (steps ST510 and ST520). In step ST520, it is judged that the response signal is not sent back after passage of a predetermined time, the diagnosis section 10b judges that the trouble communication has occurred between the first satellite unit 11 and the master unit 10, and the diagnosis section 10b outputs an instruction signal, which turns OFF the first bus switch 11a, to the command issuing section 16c. Thus, the first bus switch 11a is turned OFF, and the first satellite unit 11 is subsequently reset in step ST540, whereby other control switches 11b and 11c are turned OFF. Then, the procedure advances to the communication trouble occurrence point cutting processing and the reconstruction processing of step step E of FIG. 5.

When it is judged that the diagnosis section 10b receives the response signal, the procedures advances to the next block, and the same signal processing is performed also for the second satellite unit 12. Subsequently, the procedure advances to the processing for the third and fourth satellite units 13 and 14.

As shown in FIG. 7E, the diagnosis section 10b performs the normal communication between the first satellite unit 11 and the master unit 10 (see FIG. 7A). The diagnosis section 10b outputs the address signal A2 and the request signal Rq of the second satellite unit 12 to the second satellite unit 12. When the response signal Rs in response to these signals cannot be received (the section of the shaded portion in FIG. 7B), and when it is judged by the diagnosis section 10b of the master unit 10 that the communication trouble has occurred in the satellite unit 12, a signal for turning OFF the second bus switch 12a, the third control switch 12b and the fourth control switch 12c is supplied to the second satellite unit 12 as the request signal (the section T' of FIG. 7C), and the second bus switch 12a, the third control switch 12b and the fourth control switch 12c are turned OFF.

Thereafter, the command issuing section 16c makes the first circuit switching section 16a inoperative, and, at the same time, makes the second circuit switching section 16b operative, thus performing the initial setting processing (the section S of FIG. 7D). Thereafter, the command issuing section 16c performs the normal communication processing (the section U of FIG. 7E).

Specifically, in order to start the communication among the first satellite unit 11, the third satellite unit 13 and the fourth satellite unit 14 except for the second satellite unit 12, the switching section 16 makes the second circuit switching section 16b operative instead of the first circuit switching section 16a, and performs the initial setting processing in the order of the fourth satellite unit 14, the third satellite unit 13, the second satellite unit 12 and the first satellite unit 11. However, prior to the initial setting processing, all of the first to fourth satellite units 11 to 14 are reset, and the address signals that have been stored in the memories 11i to 14i are abandoned, and the request signal for turning OFF all of the bus switches 11a to 14a and the control switches 11b to 14b and 11c to 14c is outputted (the section T'' of FIG. 7E), whereby the whole of the circuit system is reconstructed, and the processing is performed for the first, second, third and fourth satellite units 11, 12, 13 and 14 in accordance with the flowchart illustrated in FIG. 5, thus reconstructing the circuit system.

As described above, according to the first invention, since the slave unit can always transmit information to the master unit if necessary, there is no time delay in transmitting the information, and the information can be transmitted promptly. An interruptive communication is available even when the number of the connections of the slave units is made large, and communication trouble does not occur at all in the information transmission from the slave units.

According to the second invention, when the slave unit detects the collision, the collision information can be always transmitted to the master unit promptly without time delay.

Furthermore, even when the number of the connections of the slave units is large, the interruptive communication is available when the collision occurs. Accordingly, the transmission of the collision information can be performed timely.

This application claims benefit of priority under 35USC §119 to Japanese Patent Applications No. 2002-52026, filed on Feb. 27, 2002, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A car-passenger protection system comprising:
   a master unit for judging a scale of collision from a first direction, the master unit transmitting a request signal via a signal line to a plurality of slave units and receiving a response signal in response to the request signal from each of the slave units;
   the plurality of slave units which are connected to the master unit by the signal line annularly and include first and second slave units, the first slave unit judging a scale of collision from a second direction and the second slave unit judging a scale of collision from a third direction; and
   a squib operated by a control of the master unit,
   wherein the response signal has a data area writable by each of the slave units, to which data indicating an occurrence of the collision is written when each of the first and second slave units detects the collision,
   wherein, as the master unit receives the data indicating the occurrence of the collision written on the data area by one of the first and second slave units, the master unit starts to communicate with the one of the first and second slave units just after receiving the data indicating the occurrence of the collision,
   wherein the master unit starts to communicate with the one of the first and second slave units just after receiving the data indicating the occurrence of the collision by supplying an address signal and the request signal to the one of the first and second slave units, wherein the master unit further comprises a collision judgment section that supplies the address signal and the request signal to the one of the first and second slave units via the signal line, wherein, when the collision judgment section judges that the one of the first and second slave units has detected the collision, the collision judgment section supplies the control via the signal line to the squib, and wherein the squib is located in a third slave unit for developing a side airbag.

2. The car-passenger protection system according to claim 1, wherein the writable data area is set for each of the slave units.

3. The car-passenger protection system according to claim 1, wherein, when another slave unit is scheduled for communication with the master unit before the master unit receives the data indicating the occurrence of the collision, the master unit skips communication with the another slave unit so as to start communication with the one of the first and second slave units just after receiving the data indicating the occurrence of the collision.

4. The car-passenger protection system according to claim 1, wherein the collision judgment section checks whether the one of the first and second slave units has detected the collision.

5. The car-passenger protection system according to claim 1, wherein the third slave unit sends back developing completion data with respect to the side airbag, to the master unit.

6. A car-passenger protection system comprising:

a master unit for judging a scale of collision from a first direction, the master unit transmitting a request signal via a signal line to a plurality of slave units and receiving a response signal in response to the request signal from each of the slave units;

the plurality of slave units which are connected to the master unit by the signal line annularly and include first and second slave units, the first slave unit judging a scale of collision from a second direction and the second slave unit judging a scale of collision from a third direction; and a squib operated by a control of the master unit, wherein the response signal has a data area writable by each of the slave units, to which data indicating an occurrence of the collision is written when each of the first and second slave units detects the collision, wherein, as the master unit receives the data indicating the occurrence of the collision written on the data area by one of the first and second slave units, the master unit sends the request signal to the one of the first and second slave units in response to receiving the data indicating the occurrence of the collision, wherein the master unit also supplies an address signal to the one of the first and second slave units in response to receiving the data indicating the occurrence of the collision, wherein the master unit further comprises a collision judgment section that supplies the address signal and the request signal to the one of the first and second slave units via the signal line, wherein, when the collision judgment section judges that the one of the first and second slave units has detected the collision, the collision judgment section supplies the control via the signal line to the squib, and wherein the squib is located in a third slave unit for developing a side airbag.

7. The car-passenger protection system according to claim 6, wherein the writable data area is set for each of the slave units.

8. The car-passenger protection system according to claim 6, wherein, when another slave unit is scheduled to receive the request signal from the master unit before the master unit receives the data indicating the occurrence of the collision, the master unit skips communication with the another slave unit so as to send the request signal to the one of the first and second slave units in response to receiving the data indicating the occurrence of the collision.

9. The car-passenger protection system according to claim 6, wherein the collision judgment section checks whether the one of the first and second slave units has detected the collision.

10. The car-passenger protection system according to claim 6, wherein the third slave unit sends back developing completion data with respect to the side airbag, to the master unit.

* * * * *